INVENTOR.
ROBERT H. EISENGREN
BY
Beau, Brooks, Buckley & Beau.

INVENTOR.
ROBERT H. EISENGREIN

INVENTOR.
ROBERT H. EISENGREN

United States Patent Office 3,142,018
Patented July 21, 1964

3,142,018
FINE AND COARSE POSITIONAL SERVO SYSTEM
Robert H. Eisengrein, Skaneateles, N.Y., assignor to Seneca Falls Machine Company, Seneca Falls, N.Y.
Filed Jan. 24, 1961, Ser. No. 84,665
9 Claims. (Cl. 318—28)

This invention relates generally to the control art, and more particularly to a new and useful control system for accurately moving a mass, such as the carriage of a machine tool, to a preselected position.

The system of my invention provides a coarse and a fine control, whereby the mass is first moved into the range of a preselected position-defining stop, by a coarse control. Then, the system automatically switches to a fine control for final positioning of the movable member.

A particular object of my invention is to provide a control system of this type, utilizing precision stops which are set once and become permanent members of the system, in which the coarse control is provided by comparing the actual position of the mass with the desired position thereof, and the fine control is provided by stop sensing means movable with the mass. It is also an object of my invention to provide a control system as aforesaid, in which the desired position of the mass is simply dialed into the system, which thereafter automatically causes the carriage to be moved to the desired position.

Another object of my invention is to provide a control system having the foregoing characteristics in which the distance to be traversed is measured independently of the drive mechanism whereby the system accuracy is not dependent upon the accuracy of the power driving system.

An additional object of my invention is to provide a control system as aforesaid, in which the control for positioning the mass between stops has an extremely accurate direct coupling to the mass, thereby avoiding inaccuracies resulting from additional gearing.

Still another object of my invention is to provide a system, as aforesaid, in which the final position always is approached in the same direction, thereby to avoid inaccuracies due to backlash, with means responsive to movement of the mass in the opposite direction and automatically operable to cause the mass to move beyond the preselected position, and thereafter be moved into position in the desired direction.

In one aspect thereof, a system constructed in accordance with my invention is characterized by the provision of a position defining stop adjacent the path of movement of the carriage or other mass, a second carriage mounted on the first carriage for movement therewith through the path, drive means for moving the carriage through its path, a coarse control for said drive means including means generating a first signal corresponding to the position of the carriage along the path, means generating a reference signal corresponding to the position defined by said stop and means comparing the first signal and the reference signal and generating an output control signal corresponding to the displacement of the carriage from the stop-defined position, a fine control for the drive means including a stylus carried by the carriage for movement therewith into engagement with the stop, the stylus being movable by the stop relative to the carriage into a predetermined reference position corresponding to the stop-defined position, and means generating an output control signal corresponding to the displacement of the stylus from its reference position, output signal responsive control means for the carriage drive, means, and means automatically operable to switch the carriage drive control means from the coarse control to the fine control upon arrival of the carriage at the stop-defined position as determined by the coarse control.

The foregoing and other objects, advantages and characterizing features of the control system of my invention will become clearly apparent from the ensuing detailed description of a presently preferred embodiment thereof, taken in conjunction with the accompanying drawings illustrating the same, wherein like reference numerals denote like parts throughout the various views, and wherein.

General Description

Figure 1:
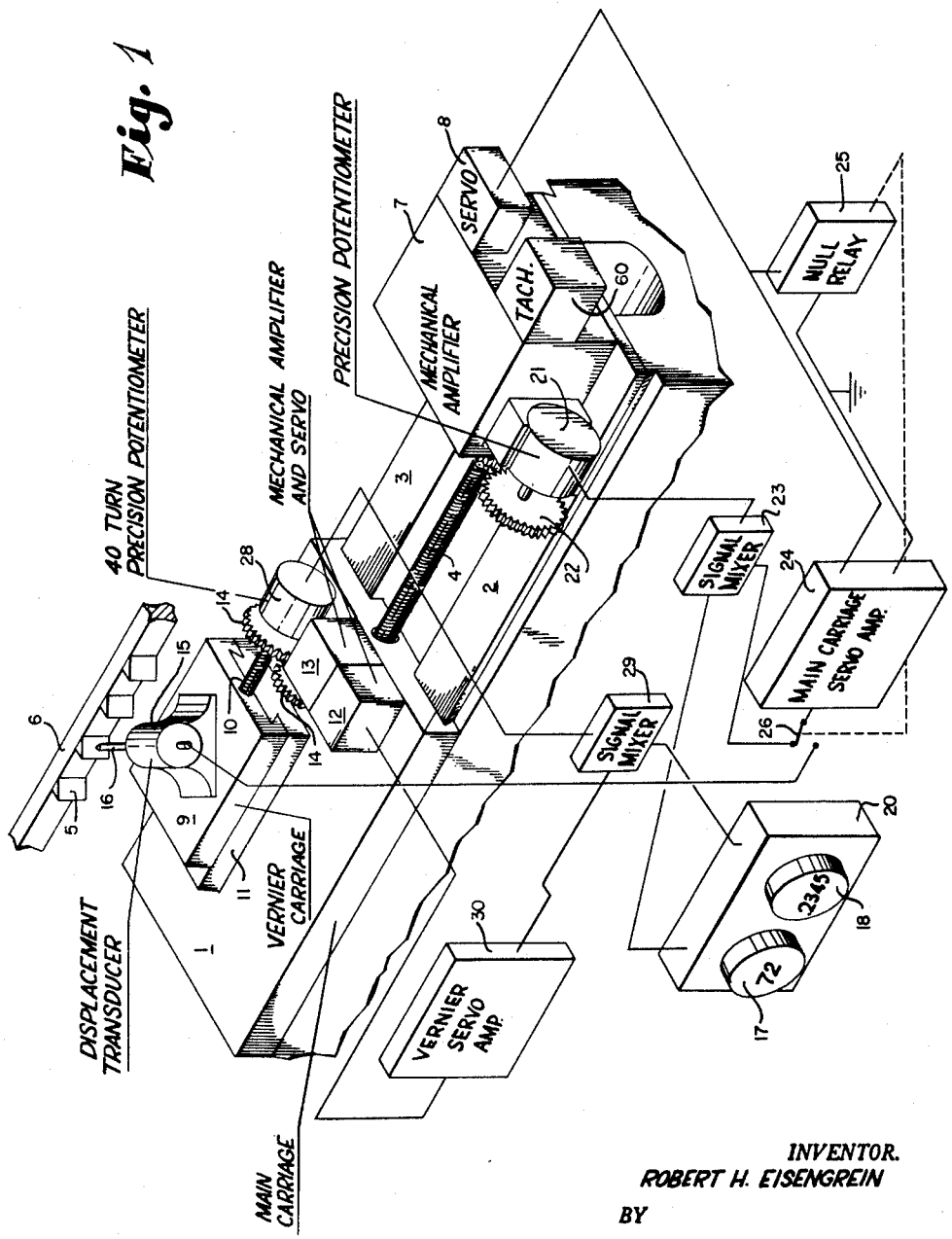
FIG. 1 is a fragmentary, perspective, schematic block diagram of a machine tool carriage incorporating the position control system of my invention.

For a better understanding of the operation of my control system, reference is made to FIG. 1 showing a machine tool having a main carriage 1 movable along the usual ways 2, 3 by a drive screw 4. While the motion of the mass to be controlled could be rotary, as well as linear, in the illustrated embodiment the carriage 1 is mounted for reciprocative linear movement along the ways 2, 3 which are supported on any suitable base. Precision mechanical stops 5, accurately spaced apart along an appropriate support 6 are positioned adjacent the path of movement of the main carriage 1. In the illustrated embodiment, stops 5 are intended to be spaced apart exactly one inch, although this obviously can be varied.

It is a particular feature of my invention that the stops 5, once they are set up, comprise a permanent installation. Additional stops can be added, for greater length, but the stops need not be replaced, or shifted, to provide a particular length different from that initially set up.

The main carriage 1 is moved by screw 4 which is driven by any desired means, such as for example a mechanical power amplifier 7 of the type described in United States Patents 2,569,585, 2,569,586, and 2,585,507. Amplifier 7 controls the transmission of drive power from an appropriate source, not illustrated, to the screw 4, under the control of signal responsive motor 8.

Carriage 1 is moved to the desired position by a combination of two control systems. The first system is responsive to the position of the main carriage 1 relative to the particular stop closest to the desired position, in the desired direction of approach, and incorporates a coarse control for moving the carriage into the range of the particular stop, and a fine control for finally positioning the carriage. The second system is responsive to the position of a vernier carriage 9, relative to the distance between the particular stop and the desired position. Carriage 9 is supported on main carriage 1 for movement therewith and for movement relative thereto by a drive screw 10 along ways 11, thus, the relative position of vernier carriage 9 on main carriage 1 can be selectively varied. The vernier carriage drive screw 10 is driven by an appropriate source of power, not illustrated, through a mechanical amplifier 13 under control of a signal responsive motor 12, a suitable gear reduction, not shown, and gears 14. Carriage 9 supports a displacement transducer 15 having a stylus 16 projecting therefrom for engagement with the stops 5, thereby to finally position the main carriage 1. Mechanical amplifier 13 can be of the type previously referred to.

While the control system of my invention can be operated by means of a coded tape or card, the illustrated embodiment is under control of calibrated dials 17, 18 which position very accurate electrical transducers in the form of potentiometers 17′ (FIG. 2) and 18′ (FIG. 3), respectively. The potentiometers 17′, 18′ can be enclosed within a housing 20, on which the dials 17, 18 are mounted.

Dials 17 and 18 are of a type adapted to be manually rotated, showing the selected position through windows provided on the dials. Thus, as shown in FIG. 1, the dials are set to position carriage 1 at 72.2345 inches.

In accordance with my invention, dial 17 is set to the nearest full inch, or other pre-set increment, and dial 18 to the desired fraction. Potentiometer 17′ then produces a signal corresponding to the last stop 5 before reaching the desired position, looking in the direction of desired approach movement and this is compared to the signal derived from a precision potentiometer 21 which is coupled to the drive shaft 4 through gearing 22. The signals are compared by an appropriate signal mixer 23, such as an electrical balance bridge. The resultant output signal is amplified by the main carriage servo amplifier 24, and energizes the control motor 8 of the main carriage drive. This provides a coarse control under which the main carriage 1 is moved to the stop defined position for which the dial 17 has been set.

When the potentiometers 17′, 21 are in balance, the main carriage control 8 is switched from the coarse control to a fine control. This switching is controlled by a relay 25, which actuates a switch 26 to thereafter compare the actual carriage position with the stop 5 for which dial 17 has been set. This is done through the transducer 15, which includes an electrical bridge balanced by inward movement of stylus 16 to a predetermined reference position, comprising in this case the null position. When the main carriage 1 is finally moved into the precise position desired, as determined by dials 17, 18, stylus 16 is in its null position producing no signal and the carriage drive is stopped.

When it is desired to move the main carriage 1 to a position offset from a particular stop 5, dial 18 is manipulated to indicate the fractional increment represented by the offset. Potentiometer 18′ then produces a signal corresponding to the desired fraction or offset, and this signal is compared with a signal derived from potentiometer 28 which is directly coupled to the vernier carriage drive 10. The comparison is made through an appropriate signal mixer 29, such as an electrical balance bridge. The resulting output signal is amplified, by the verier servo amplifier 30, and energizes the vernier carriage drive control 12 for shifting the vernier carriage 9 relative to the main carriage 1. Thereafter, stylus 16 will not be moved to its predetermined null, and the main carriage drive will not stop, until the carriage 1 has moved to the stop-defined position of dial 17, plus the desired fractional increment of dial 18. Amplifiers 24 and 30 are conventional, and per se no part of my invention.

*Main Carriage Control*

Figure 2:
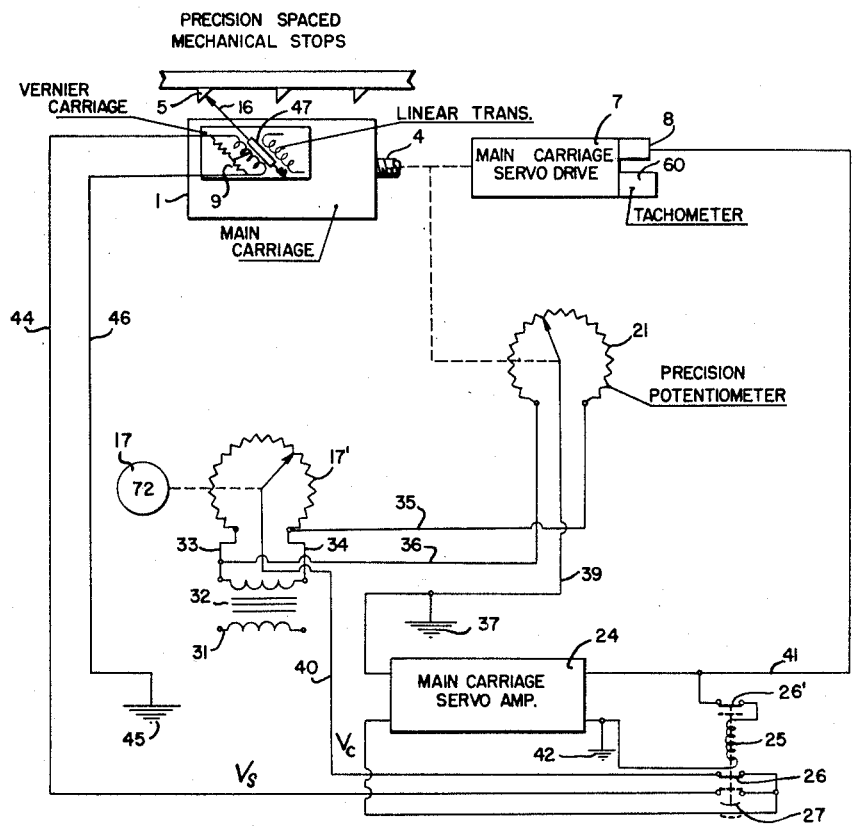
FIG. 2 is a schematic diagram of the main carriage control circuit.
Figure 3:
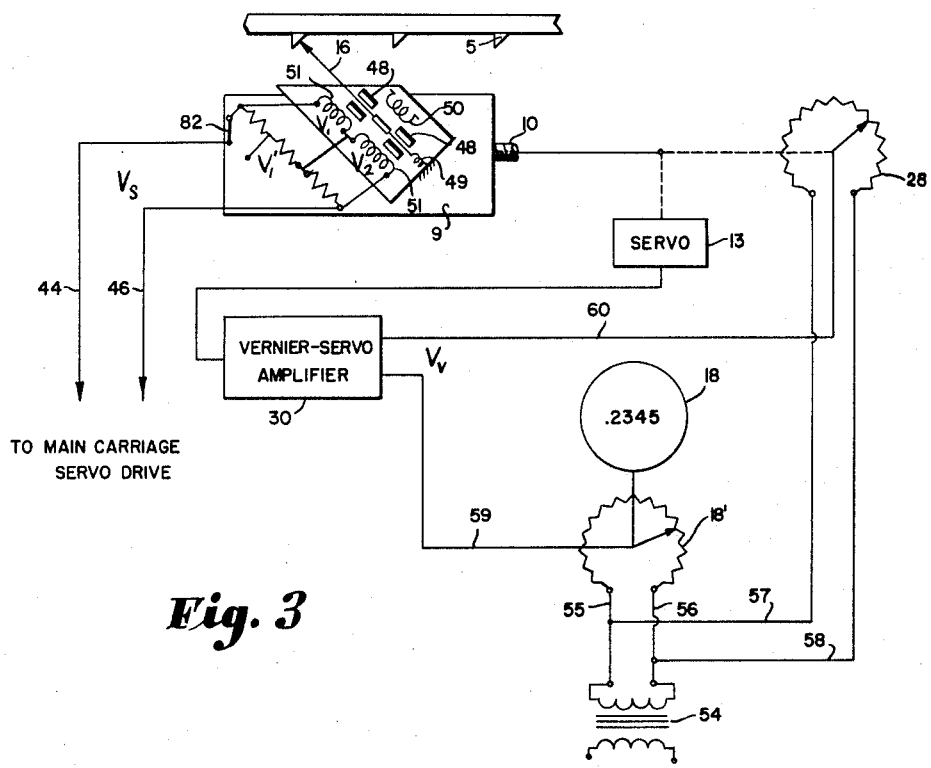
FIG. 3 is a similar diagram of the vernier carriage and its control circuit for moving the main carriage to a position between stops.

Referring now in greater detail to the main carriage control, and particularly to FIG. 2, potentiometer 17′ is preset by dial 17 to the desired stop-defining position, for example 72 inches, and provides a voltage signal which varies with the setting of dial 17. Potentiometer 21 is coupled to the main carriage drive 4, thereby providing a voltage signal which corresponds to the position of the main carriage 1 along its path of movement. Potentiometer 21 is designed so that it will rotate its maximum number of turns for the maximum carriage travel desired. Both potentiometers 17′, 21 are excited from a common voltage source 31 through a transformer 32, and are interconnected in a conventional electrical balance bridge arrangement through leads 33, 34, 35 and 36. This electrical bridge is grounded at 37, through lead 39 and when unbalanced produces an output signal $V_c$ which is transmitted to the main carriage servo amplifier 24 through lead 40. The amplified output signal is transmitted to the main carriage control through lead 41.

The control servo 8, when thus energized, causes carriage 1, to be moved toward the 72 inch stop 5. Relay 25 is connected to amplifier 24, through lead 41, and is grounded at 42, whereby relay 25 also is energized by the amplified output signal $V_c$ to the main carriage servo 8. When carriage 1 has moved into the range of the 72 inch stop, potentiometers 17′ and 21 will balance and there will be no output signal $V_c$. Relay 25 then will be de-energized, causing switch 26 to move to its broken line position and open the circuit represented by lead 40, thereby disconnecting the main carriage servo amplifier 24 from the coarse control just described, and close a circuit represented by lead 44 thereby connecting amplifier 24 to the fine control for accurately positioning carriage 1. The fine control is provided by transducer 15, which is grounded at 45 through a lead 46. Transducer 15 (FIGS. 2 and 3) comprises a linear transformer having a movable core 47 connected to stylus 16 for movement therewith. Stylus 16 is supported in bearings 48 and is spring urged to project outwardly from transducer 15 by spring 48.

Thus, the stylus core 47 is the core of a variable transformer excited by a winding 50 comprising a primary coil energized from any approapriate power supply, not illustrated. The transformer has opposed secondary coils 51 arranged so that when the movable core 47 is centered in null position relative thereto, the secondary voltage is cancelled out, resulting in a zero output signal $V_s$. Normally, spring 49 urges core 47 out of its null position, thereby producing an output signal comprising voltage $V_s$ which is transmitted through lead 44 and switch 26 to the amplifier 24. Signal $V_s$ is then amplified and transmitted through lead 41 to the control servo drive. Relay 25 is not energized by signal $V_s$ but remains de-energized because switch 26′ opens its energizing circuit.

Thus, by means of the course control provided by potentiometers 17′ and 21, the carriage 1 is moved to a position within the range of the preselected stop 5. The system then automatically switches to the fine control provided by transducer 15 which physically senses the sloping face of the stop 5. By this means the carriage is moved to the precise position defined by the selected stop. It will be appreciated that the null position of stylus 16 and core 47 is so arranged that when the vernier carriage 9 is in its zero position on carriage 1, the carriage 1 will be stopped at precisely the position defined by the selected stop.

When dial 17 is reset, to move carriage 1 to another stop defined position, switch 26 is manually closed, by button 27 until relay 25 is energized by signal $V_c$.

*Vernier Carriage Control for Positioning the Main Carriage Between Stops*

Often it is desired to move the carriage 1 to a position offset from a particular stop 5 by a fraction of the increment between stops. This is accomplished by shifting the vernier carriage 9 relative to the main carriage 1 away from its zero position. To this end, dial 18 is set to the desired increment fraction comprising, in the example shown, .2345 inch. Rotating dial 18 rotates potentiometer 18′ to provide a voltage signal corresponding to the desired offset from the stop, and this signal is compared to a signal corresponding to the relative position of carriage 9 on carriage 1 as produced by a potentiometer 28 which is directly coupled to the linear carriage drive screw 10. It is a particular feature of my invention that, because of the vernier carriage 9 moves less than one inch, an extremely accurate forty turn micrometer screw can be used for drive screw 10. This is directly coupled to an accurate forty turn potentiometer 28. By using a micrometer screw and direct coupling without intermediate gearing, an accuracy on the order of plus or minus 0.0001 inch can be achieved.

Potentiometers 18' and 28 are connected in a conventional electrical balance bridge arrangement excited by a transformer 54 from a source, not illustrated, through leads 55, 56, 57 and 58. The output leads 59 and 60 are connected to the vernier carriage servo amplifier 30, in a manner providing an output signal corresponding to the displacement between the relative positions of vernier carriage 9 on main carriage 1 and the desired offset position as determined by dial 18. This output signal $V_v$ is amplified and transmitted to the vernier carriage drive control servo 13, which causes the micrometer screw 10 to be rotated, shifting the position of carriage 9 on carriage 1, until the bridge comprising potentiometers 18', 28 is balanced. Thus, transducer 15 and stylus 16 are shifted out of zero position whereby the stylus core 47 will not be pushed into its balanced or null position until the carriage has moved past the 72 inch stop 5 an amount equal to the setting of dial 18. It will be noted that the vernier carriage drive 10 and its control are completely separate from the main carriage drive and its control.

Automatic Approach Direction Control

The transducer stylus 16, as illustrated, is designed to approach the stop 5 in only one direction. If desired, or where backlash is no problem, the stylus could be redesigned to permit the approach of carriage 1 to its final position in either direction. However, where backlash is a problem and should be avoided, the final carriage approach is always in the same direction from right to left in the accompanying drawings. If the actual carriage position is greater, and to the left of the desired carriage position, the carriage first must be moved too far, to the right of the desired position. The final approach then is made from right to left. This is accomplished in the system of my invention by unbalancing the fine control vernier transformer comprising transducer 15.

Figure 4:
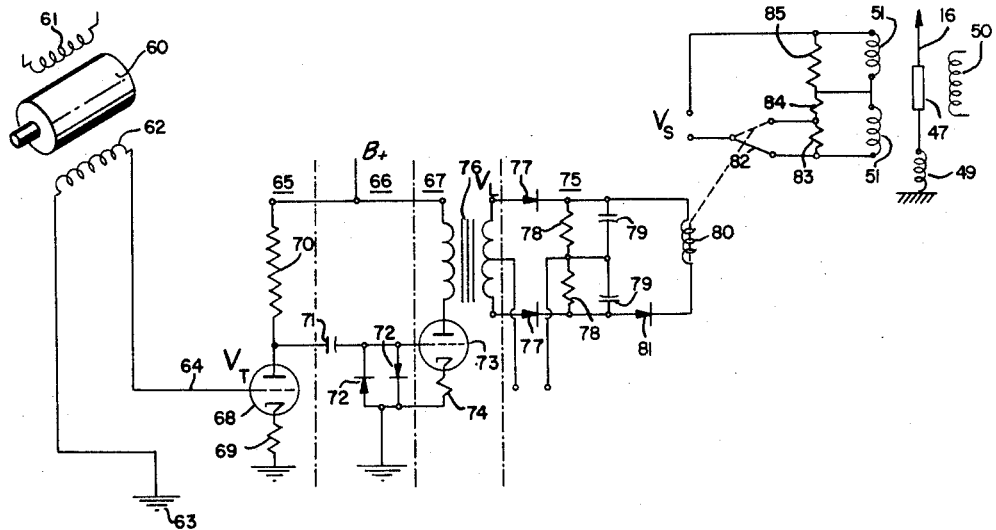
FIG. 4 is a schematic diagram of the circuit for causing the carriage to move into final position in the same direction.

A signal corresponding to the movement of main carriage 1 is provided by a speed responsive tachometer 60 (FIG. 4) which produces a voltage proportional to the magnitude of carriage speed and a phase corresponding to the direction of carriage movement. The tachometer is excited from a source, not illustrated, through a coil 61, to induce a current in coil 62, grounded at 63 and connected through lead 64 to an amplifier-limiter comprising a first amplifier stage 65, a limiter stage 66 and a second amplifier stage 67. Thus, there is generated a voltage $V_T$ which is amplified, and limited, to provide an output voltage signal $V_L$ of constant magnitude, above a certain level with a polarity or phase determined by the direction of movement of the carriage.

Figure 6:
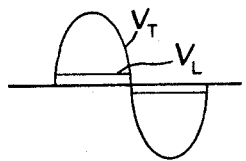
FIG. 6 is a graphical illustration of the operation of the limiter in FIG. 4.

The amplifier stages are conventional, comprising in the first stage 65, an amplifier tube 68 having a bias resister 69 and a plate resister 70 and in the second stage 67, a second amplifier tube 73 having a bias resister 74. Plate voltage is provided from an appropriate source, not illustrated, as indicated at B+. Limiter 66 comprises opposed diode rectifiers 72, and is coupled to the output of the first amplifier stage 65 through a condenser 71. The amplifier-limiter is connected through transformer 76 to a phase sensitive demodulator 75 comprising diode rectifiers 77, resistors 78 and capacitors 79, connected in opposition and excited from a suitable A.C. source, not illustrated, to produce a D.C. output voltage $V_T$ (FIG. 6). Voltage $V_T$ is connected to a relay 80 through a diode rectifier 81, whereby relay 80 is energized only when the output voltage $V_T$ is of a particular polarity.

Figure 5:
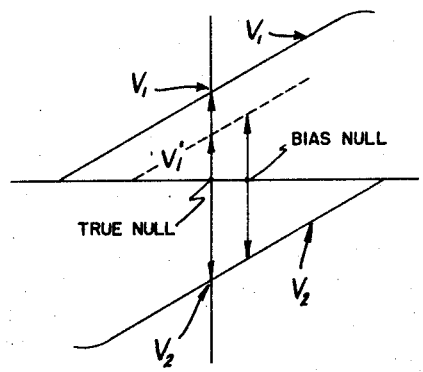
FIG. 5 is a schematic diagram graphically illustrating the operation of the circuit of FIG. 4.

Therefore, if carriage 1 is moving from right to left, the output voltage $V_T$ will be of such polarity that it will not pass by rectifier 81, and relay 80 will not be energized. However, if carriage 1 is moving from left to right, then relay 80 will be energized by the voltage $V_T$ to move a switch 82 and bypass a resistance 83, leaving only a resistance 84 across one transducer coil 51. Resistors 83 and 84 together equal resistor 85, whereby eliminating resistor 83 will cause the transducer 15 to shift its null position from a true null to a false or bias null. This is clearly indicated in FIG. 5, wherein V1 is the normal voltage across the one coil 51, V1' is the bias voltage thereacross, and V2 is the voltage across the other coil 51. The false or bias null causes the stylus 16 to move to a different position in order to balance the vernier transformer, and this causes the carriage 1 to move into a position to the right of the desired stop 5. As soon as the carriage stops moving, relay 80 is de-energized, causing the switch 82 to shift whereby normal transducer operation is allowed. The transducer 15 then generates an output signal Vs causing the main carriage drive 4 to be actuated and move the main carriage from right to left into its final position.

Summary of Operation

Considered in its entirety, my control system operates as follows. The operator sets the dials 17 and 18 to a distance corresponding to the desired position of the main carriage. Potentiometer 17' is then compared with the actual position of the carriage, through potentiometer 21, to provide a coarse control moving the carriage into the range of the selected stop. Then, relay 25 switches the main carriage drive to the fine control provided by transducer 15 which controls movement of the carriage into its precise position.

Simultaneously, the vernier carrier 9 is shifted on the main carriage 1 to an offset position corresponding to that for which dial 18 is set. This is accomplished by comparing the potentiometer 18' with the vernier carriage potentiometer 28.

This vernier carriage adjustment occurs while the main carriage is being moved to its final position, so that the vernier carriage will be offset on the main carriage a distance equal to the distance beyond the selected stop to which the main carriage is to be moved. Therefore, as the main carriage approaches its final position and moves into range of the particular stop 5 for which dial 17 is set, its control shifts to the fine control provided by transducer 15 which has been shifted on carriage 1 to take into account the desired degree of movement beyond the particular stop.

While this is taking place the tachometer 60 senses the direction of carriage movement. If it is from left to right, to a measured length shorter than its actual position, the transducer 15 is biased by operation of relay 80, causing the carriage to move to a false final position. Then, transducer 15 is restored to its normal condition, whereupon it causes the carriage to move from right to left into the precise desired position.

Accordingly, it is seen that my invention fully accomplishes its intended objects. While I have illustrated and described only one, presently preferred embodiment, that has been done by way of illustration only without thought of limitation. I am aware that variations therein and modifications thereof will occur to those skilled in the art, without departing from my invention, and I intend to include the same within the scope of the appended claims.

Having fully disclosed and completely described my invention, what I claim as new is:

1. A system for controlling the position of a carriage movable through a predetermined path comprising, a position-defining stop adjacent said path, drive means for moving said carriage through said path, a coarse control for said drive means including means generating a first signal corresponding to the position of said carriage along said path, means independent of said stop generating a reference signal corresponding to the position defined by said stop, and means comparing said first signal and said reference signal and generating a coarse output control signal corresponding to the displacement of said carriage from said stop-defined position, a fine control for said drive means including a stylus carried by said carriage for movement therewith through said path into engagement with said stop, said stylus being movable by said stop relative to said carriage into a predetermined reference position corresponding to the position defined by said stop, and means generating a fine output control signal corresponding to the displacement of said stylus from said reference position, output signal responsive control means for said carriage drive means, and means automatically operable to switch said carriage drive control means for said coarse control to said fine control upon arrival of said carriage at said stop-defined position as determined by said coarse control.

2. A system as set forth in claim 1, together with means for shifting said stylus relative to said carriage to shift said reference position and thereby define a carriage position offset from said stop.

3. A system as set forth in claim 1, wherein there are a series of position-defining stops arranged along said path for successive engagement by said stylus, said reference signal generating means being selectively variable to generate a signal corresponding to the position defined by a particular one of said stops, said automatically operable switch means maintaining said carriage drive control means under said coarse control until said carriage has arrived at said one stop-defined position as determined by said coarse control.

4. A system as set forth in claim 1, wherein said carriage is movable in opposite directions through said path, together with means responsive to movement of said carriage generating a second signal corresponding in phase to the direction of such carriage movement, and phase sensitive means responsive to said second signal for shifting said reference position during movement of said carriage in one direction whereby said carriage always finally approaches said stop in the opposite direction.

5. A system for controlling the position of a main carriage movable through a predetermined path comprising, a position-defining stop adjacent said path, a second carriage mounted on said main carriage for movement therewith through said path, drive means for moving said main carriage through said path, a coarse control for said drive means including means generating a first signal corresponding to the position of said main carriage along said path, means generating a reference signal corresponding to the position defined by said stop, and means comparing said first signal and said reference signal and generating a coarse output control signal corresponding to the displacement of said main carriage from said stop-defined position, a fine control for said drive means including a stylus carried by said second carriage for movement therewith through said path into engagement with said stop, said stylus being movable by said stop relative to said second carriage into a predetermined reference position corresponding to the position defined by said stop, and means generating a fine output control signal corresponding to the displacement of said stylus from said reference position, output signal responsive control means for said main carriage drive means, means automatically operable to switch said main carriage drive control means from said coarse control to said fine control upon arrival of said main carriage at said stop-defined position as determined by said coarse control, drive means for moving said second carriage relative to said main carriage, a control for said second carriage drive means including means generating a second signal corresponding to the position of said second carriage relative to said main carriage, means generating another reference signal corresponding to a desired position offset from said stop, means comparing said second signal and said other reference signal and generating another output signal corresponding to the difference between the displacement of said second carriage from said reference position and said desired offset, and second carriage drive control means responsive to said other output signal.

6. A system for controlling the position of a main carriage movable through a predetermined path comprising, a position-defining stop adjacent said path, a second carriage mounted on said main carriage for movement therewith through said path, drive means for moving said main carriage though said path, a coarse control for said drive means including potentiometer means coupled to said main carriage generating a first electrical signal corresponding to the actual position of said main carriage along said path, selectively variable potentiometer means generating a reference electrical signal corresponding to the position defined by said stop, and electrical balance bridge means comparing said first signal and said reference signal and generating a coarse electrical control signal corresponding to the displacement of said main carriage from said stop-defined position, a fine control for said drive means including a stylus carried by said second carriage for movement therewith through said path into engagement with said stop, a variable transformer having a core movable by said stylus, said stylus being movable by said stop relative to said second carriage to move said core into a predetermined reference position corresponding to the position defined by said stop, said transformer generating a fine electrical control signal corresponding to the displacement of said core from said reference position, signal responsive control means for said main carriage drive means, and means automatically operable to switch said main carriage drive control means from said coarse control to said fine control upon arrival of said main carriage at said stop-defined position as determined by said coarse control.

7. A system as set forth in claim 6, together with drive means for moving said second carriage relative to said main carriage, a control for said second carriage drive means including potentiometer means coupled to said second carriage generating a second signal corresponding to the position of said second carriage relative to said main carriage, selectively variable potentiometer means generating another reference signal corresponding to a desired position offset from said stop, electrical balance bridge means comparing said second signal and said other reference signal and generating another electrical control signal corresponding to the difference between the displacement of said second carriage from said reference position and said desired offset, and second carriage drive control means responsive to said other control signal.

8. A system as set forth in claim 6, wherein said main carriage is movable in opposite directions through said path, together with means responsive to movement of said main carriage generating an electrical signal corresponding in phase to the direction of such carriage movement, phase sensitive means responsive to said last-named signal biasing said transformer to shift said reference position during movement of said main carriage in one direction, whereby said main carriage always finally approaches said stop in the opposite direction.

9. A system as set forth in claim 7, wherein said second carriage drive means comprises a micrometer screw, and said second carriage drive potentiometer is directly coupled to said drive screw.

References Cited in the file of this patent

UNITED STATES PATENTS

| | | |
|---|---|---|
| 2,843,811 | Tripp | July 15, 1958 |
| 2,907,937 | Agpar et al. | Oct. 6, 1959 |
| 2,960,688 | Prochaska et al. | Nov. 15, 1960 |
| 3,011,113 | Jerve et al. | Nov. 28, 1961 |